United States Patent [19]
Wolfe et al.

[11] Patent Number: 5,190,879
[45] Date of Patent: Mar. 2, 1993

[54] CONTROLLED ENVIRONMENT ANIMAL ISOLATION SYSTEMS

[75] Inventors: N. Lee Wolfe; Franklin W. Range, both of Athens, Ga.

[73] Assignee: Bowolfe, Inc., Watkinsville, Ga.

[21] Appl. No.: 742,084

[22] Filed: Aug. 1, 1991

Related U.S. Application Data

[63] Continuation of Ser. No. 519,837, May 8, 1990, abandoned.

[51] Int. Cl.⁵ .................. C12M 1/00; C12M 1/22; A01K 1/00; A01K 31/00
[52] U.S. Cl. ..................... 435/287; 435/297; 119/15
[58] Field of Search .............. 119/15; 435/287, 292; 156/69; 73/865.6

[56] References Cited

U.S. PATENT DOCUMENTS

| | | | |
|---|---|---|---|
| 3,283,743 | 11/1966 | Dibelius | 119/15 |
| 3,997,396 | 12/1976 | Delente | 195/1.8 |
| 4,024,020 | 5/1977 | Weiss et al. | 195/1.8 |
| 4,334,500 | 6/1982 | Ziller | 119/15 |
| 4,444,602 | 4/1984 | Conover | 210/500.6 |
| 4,480,587 | 11/1984 | Sedlacek | 119/15 |
| 4,640,228 | 2/1987 | Sedlacek | 119/15 |
| 4,680,269 | 7/1987 | Naylor | 435/301 |
| 4,775,628 | 10/1988 | Takakura et al. | 435/297 |
| 4,814,132 | 3/1989 | Aoki et al. | 264/165 |
| 4,907,536 | 3/1990 | Chrisler | 119/15 |
| 4,933,082 | 6/1990 | Yamada et al. | 210/490 |
| 4,935,371 | 6/1990 | Rickloff | 435/296 |

FOREIGN PATENT DOCUMENTS 171174 8/1984 European Pat. Off. ............ 435/297

*Primary Examiner*—Jill A. Johnston
*Assistant Examiner*—N. Bhat
*Attorney, Agent, or Firm*—Kilpatrick & Cody

[57] ABSTRACT

Containers utilizing economical gas-permeable, ultra-thin dense skin polydimethylsiloxane membranes incorporating porous substrates as passive contaminant barriers in containment systems for research, breeding, housing, and shipping of animals, including fish, birds, and mammals, and plants, or animal, plant or microbial cells. These membranes protect the animals from airborne pathogens while permitting exchange of respiratory gases and metabolic heat, as well as protect laboratory personnel, mail handlers, and others who come in contact with or transport the animals from animal borne allergens and infectious agents.

26 Claims, 2 Drawing Sheets

CONTROLLED ENVIRONMENT ANIMAL ISOLATION SYSTEMS

This is a continuation of copending application Ser. No. 07/519,837 filed on May 7, 1990, now abandoned.

The present invention relates to animal and plant isolation systems that incorporate gas permeable membranes supported on porous substrates as passive barriers to movement of contaminants into or out of the isolation container.

BACKGROUND OF THE INVENTION

Millions of laboratory animals are used every year in experimental research. These animals range in size from mice to non-human primates. In order to conduct valid and reliable experiments, researchers must be assured that their animals are protected from pathogens and microbial contaminants that will affect test results and conclusions. *Guide for the Care and Use of Laboratory Animals*, (1985) U.S. Department of Health and Human Services, NIH Pub. No. 82-23.

Many laboratory animals have subclinical infections, in which they do not demonstrate any overt signs of disease. Because more research is now being conducted at the molecular and microscopic level, these subclinical infections are being discovered and are invalidating research. Orcutt, R. P. (1987) *How to Conduct Rodent Research Free of MHV, Sendai Virus, and Other Pathogens*, Lab Animal. May/June. Bhatt, P. N. et al, eds. (1986) *Viral and Mycoplasmal Infections of Laboratory Rodents, Effects on Biomedical Research*, Academic Press, Orlando, Fla. Parker, J. C., Whiteman, M. D. and Richter, C. B. (1978) *Susceptibility of Inbred and Outbred Mouse Strains to Sendai Virus and Prevalence of Infection in Laboratory Rodents*, Infection and Immunity. 19:123-130. These and other studies demonstrate that contamination and compromised animal integrity is a pervasive problem in the United States. The loss of biological integrity results in significant losses in valuable research time and money in laboratory animal research.

In addition to protecting animals from extraneous contamination, there is a need to isolate laboratory personnel from allergens that are indigenous to a species or hazardous agents that are experiment specific. For example, many technicians and scientists are troubled by allergic reactions to animal dander. There is also the threat of contracting contagious diseases that are present in animal studies.

Over the past two decades, the animal industry has made great strides in trying to solve these contamination problems. Most of this change has been a result of higher standards of health, imposed by various governmental agencies and regulatory groups. Parker, J. C. (1980) *The possibilities and limitations of virus control in laboratory animals*, pp. 161-172 in Animal Quality and Models in Bio-medical Research. A. Spiegel, S. Erichsen, and H. A. Solleveid, eds. New York: Gustav Fischer Verlag. Breeders use elaborate barrier systems for breeding, and produce animals that range in biological integrity from some type of specific pathogen free mice to gnotobiotic mice. Breeders also have barrier systems for hamsters, gerbils, guinea pigs and larger laboratory animals. Unfortunately, most research facilities do not have elaborate containment systems required to maintain biological integrity and animals can become contaminated at the research facility or in transit, where they are exposed to the open environment.

The current technology to isolate small laboratory animals in research facilities consists of filtered air hoods, filtered air housing units and filtered air rooms. These systems are very expensive and are stationary in nature. There is currently a trend towards the use of micro-isolator cages, in which only the food, bedding, etc. have to be changed in filtered air hoods. The most common filter media used in the laboratory animal industry is a spunbonded polyester, Reemay ® 2024. It has an 85% atmospheric dust removal efficiency for particles in the 1 to 5 micron range but only a 28% efficiency for particles in the 0.3 to 1 micron range. *Atmospheric Duct Efficiency (ASHRAE Test Duct—Coulter Counter)*, (1988) REEMAY For Air Filtration Sales Literature, Snow Filtration Company. Also available are micro-barrier containers that are constructed of pressed pulp. The pressed pulp forms a dense mat of wood fibers that acts as a depth filter to block the passage of microbial contaminates. Tanner Products, Co. St. Louis, Mo.

It is therefore an object of the present invention to provide a method and means for isolating animals in transit, as well as in the laboratory, from bacteria, viruses, and other pathogenic or potentially pathogenic agents.

It is further object of the invention to provide a means for protecting animals in transit, and those exposed to them, at minimal expense and effort.

It is a still further object of the present invention to provide a means for protecting and isolating animals in transit from environmental agents while allowing free exchange of gases without building up excessive temperatures within the animal facilities.

SUMMARY OF THE INVENTION

Controlled environment animal and plant containment systems are constructed using membranes having a high permeability to atmospheric gases necessary for animal respiration, as well as to volatile metabolic waste products, and serving as a barrier against microbial contaminants in the surrounding environment. The membranes are made from linear and cross-linked polydimethylsiloxanes, including polydimethylsiloxanes wherein phenyl, vinyl, trifluropropyl, silanol or hydrogen is substituted for methyl, polydimethylsiloxane bisphenol A polycarbonate block co-polymers, polydimethylsiloxane polysulfone block co-polymers, or poly [1-(trimethylsilyl)-1-propyne], including any substituted polydimethylsiloxanes and combinations thereof, using one of two processes. The first process produces a single to multiple layer membrane in a continuous process. The second process uses a novel technique to form a monolayer anisotropic "matrix" membrane. In both processes, the membranes incorporate porous substrates, are highly permeable to gases, are impermeable to microbial contaminates, allow body heat from the animals to escape, withstand handling and are sterilizable.

In the preferred embodiments, the containers are designed for the transportation and care of animals and plants. In alternative embodiments, the containers are used for bacterial, yeast, plant or animal cell culture, where the membranes are incorporated into the culture container, such as a roller bottle or culture flask.

DETAILED DESCRIPTION OF THE INVENTION

Figure 1:
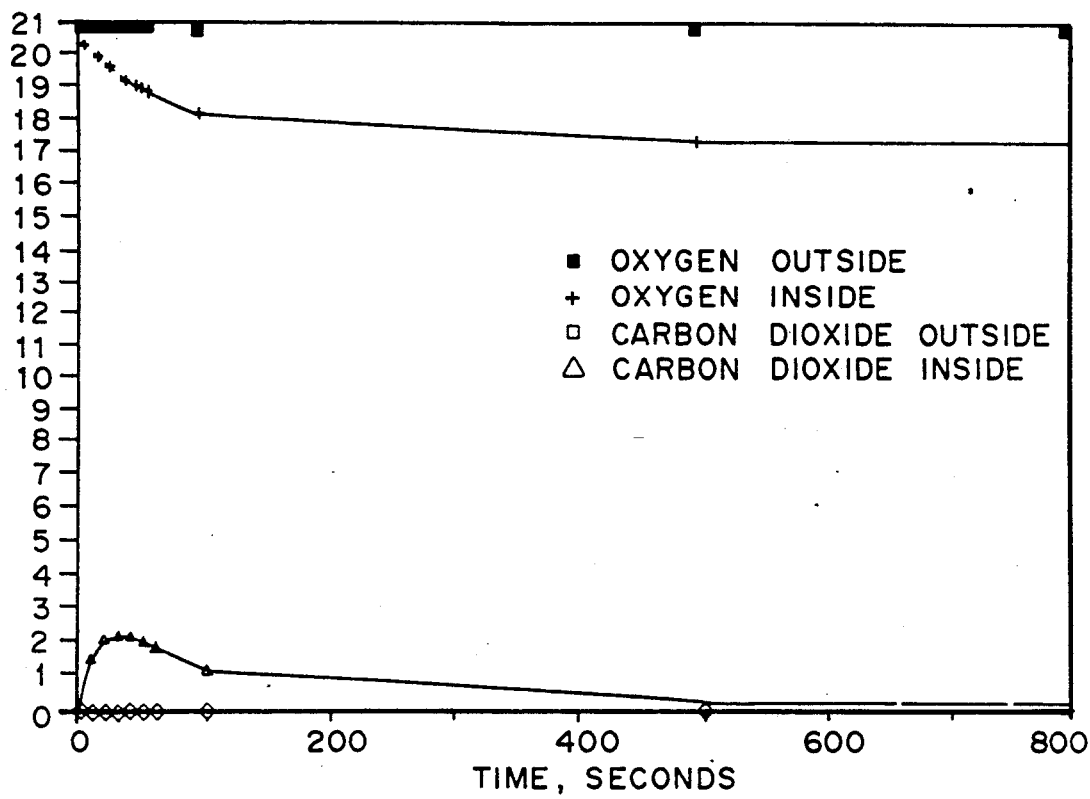
FIG. 1 is a graph of the output of a kinetic model of the transport of oxygen and carbon dioxide across a membrane-fitted cage containing 5 mice and having a ultra-thin dense skin membrane with an overall thickness of 25 microns and a surface area of 77 cm$^2$, plotting oxygen and carbon dioxide percent versus time in seconds for outside oxygen ■, oxygen inside (+), carbon dioxide outside ($\pi$), and carbon dioxide inside ($\Delta$).

These membranes, and containment systems incorporating them, are useful for isolating animals for research, testing, or during shipping, and in protecting laboratory personnel, mail handlers, and others who come in contact with or transport small animals from animal related allergens and infectious agents. Animal containment systems employing membranes have utility in research, breeding, housing, and shipping of animals throughout the United States and the world. These containment systems provide an effective and economical alternative to HEPA filtered controlled environments to control environmental variables encountered in animal housing and transport containers. Any type of animal can be housed or transported in these containers, ranging from fish and reptiles to birds and mammals, as long as there is sufficient membrane area to permit the necessary exchange of gases and metabolic heat.

These containers also have application in the shipping and housing of plants, particularly as applied to the isolation of plants from insects and air borne pollen. For example, these membranes can be used to isolate the flowering portion of the plant from accidental fertilization, rather than the gas impermeable plastic bags currently used.

Animal, bacterial, and plant cells can also be cultured in containers wherein gas exchanged is regulated by these membranes.

Additional applications of the gas permeable ultra-thin dense skin membrane as a passive barrier to viral and microbial contamination occur in the medical field where the transport and storage of biological materials requires a biologically secure container. Even humans can be protected from airborne contaminants with these membranes.

SELECTION AND MANUFACTURE OF MEMBRANES

The gas-permeable, ultra-thin skin dense composite membranes described herein are fundamentally different from the filters that are commonly used for laboratory animal isolation. In conventional filter material, substances are trapped in a fiber matrix, rather than excluded, as by the membranes. For example, in pressed pulp micro-barrier containers, contaminating particles and microorganisms are not excluded from entering the dense mat of fibers, but remain within the filter matrix due to the depth and density of the mat. Both types of membranes described below instead present a solid surface to the environment which excludes passage of microorganisms, including bacteria, viruses, fungi, and yeast, but allows two-way exchange of small kinetic diameter gases such as oxygen, carbon dioxide, nitrogen, ammonia and water vapor. Substances can only pass through the membrane if they can diffuse through the membrane. If there is a partial pressure difference, gases such as $CO_2$, $O_2$, $NH_3$, and water vapor can pass through the membrane. Microorganisms, however, are large and insoluble in the polymer matrix and cannot pass through the membrane. As a result, ultra-thin dense skin membranes are almost 100% efficient at removing particles larger than a few nanometers.

As used herein, "gas-permeable, ultra-thin dense skin composite membranes" refers to membranes manufactured by either of the processes described below. However, the two membranes have different properties and one may be preferred for some applications, and the other for different applications. The multilayer continuous membrane is preferred in the construction of animal shipping and isolation cages. As used herein, the thickness of the finished membrane refers to the diameter of the membrane including the substrate, unless otherwise specified.

The same polymers, porous support substrates, and solvent systems can be used in either method, as described below.

Suitable polymers include the linear and cross-linked polydimethylsiloxanes, including polydimethylsiloxanes wherein phenyl, vinyl, trifluropropyl, silanol or hydrogen is substituted for methyl. Other useful polymers include polydimethylsiloxane bisphenol A polycarbonate block co-polymers, such as poly(dimethylsiloxane-co-bisphenol A polycarbonate), polydimethylsiloxane polysulfone block co-polymers, and poly [1-(trimethylsilyl)-1-propyne]. These polymers include any substituted polydimethylsiloxanes and any combinations thereof. Examples of these polymers and methods for synthesis thereof are described in U.S. Pat. Nos. 2,999,845 and 3,189,662.

The polymers are dissolved in a solvent such as dichloromethane. Various solvents may be substituted for dichloromethane as long as they solubilize the membrane-forming polymer, are immiscible in water, and are sufficiently volatile so that the solvent evaporates from the polymer-solvent solution when exposed to air. These include low molecular weight halogenated hydrocarbons (for example, halogenated methanes such as methylene chloride, chloroform, carbon tetrachloride, halogenated ethanes), tetrachloroethylene, hexachloroethane polyhalogenated propanes, and other hydrocarbons having densities greater than one.

The membranes may be supported by a wide variety of substrates, or be self-supporting. They must be porous and the pore diameter must be small enough for the membrane to span the opening without breaking, preferably less than one mm. To be acceptable to the laboratory animal industry, the support material must be sufficiently porous to not significantly inhibit the gas transfer of the membrane. Preferably, the substrate must be flexible enough to pass through the membrane making machine and be available in sheets and rolls. In order to withstand normal laboratory usage, it must also be strong and able to withstand sterilization via cage washing, autoclaving, ethylene oxide (EtO), or gamma irradiation.

Substrates may be in the form of woven fabrics or wire screen, spunbonded nonwoven fabrics, felted fabrics, paper, extruded or cast polymer films, and sintered polymers. These materials can be natural, including plant fibers such as cellulose, cotton, and animal fibers. Synthetic materials include metal wire, fiberglass (woven and felted), and many of the synthetic polymers commercially available, such as polyesters, polyethylenes, polyolefins, polyamides, polycarbonate, polysulfones polypropylenes, polytetrafluoroethylene and others. Three preferred, economical support materials that meet all of these standards are Tyvek ® (spunbonded polyolefin from DuPont), Reemay ® (spunbonded polyester from DuPont), and Hollytex ® (hot-calendered spunbonded polyester from Filtration Sciences).

"CONTINOUS MEMBRANES"

These continous membranes, free of micro-pores, are produced in one or several ultra-thin layers using standard techniques known in the art, such as the process taught by U.S. Pat. No. 3,767,737 issued in 1973 to Lundstrom, the teachings of which are incorporated herein. Basically, the polymer is dissolved in an appropriate solvent and overlaid with water, then the polymer is raised to the surface of the water with a roller, where it spreads out to form a thin film which is picked up by the porous substrate. To increase membrane strength, composite membranes are produced by casting consecutive layers. Membrane thickness usually ranges from 1 micron for a single layer to 25 microns, with best results at between 1 micron and 15 microns, with a preferred thickness of one micron. Membrane thickness is controlled by varying feed times, solvent evaporation rates, and/or polymer dilution.

"MATRIX MEMBRANES"

To make an anisotropic matrix membrane, substrate, saturated with a polymer solution containing a solvent that is immiscible with water, is floated across the surface of a water bath. Concurrently, volatile polymer solvent evaporates, causing the dissolved polymer to coalesce, forming a uniform ultra-thin dense skin membrane. The residual solvent in the membrane is subsequently removed by additional drying. The thickness of the resulting membrane is determined by the dilution of the polymer in the solvent. It cannot be made in multiple layers without losing its asymmetrical structure. The polymeric membrane in combination with substrate ranges in overall thickness from approxiamately 0.002 cm to approximately 0.060 cm.

In the preferred embodiment, the ultra-thin dense skin membrane is made by feeding spun-bonded polyester substrate material with a thickness of 0.03 cm at a rate of 10 cm/min to 100 cm/min, preferably 10 to 60 cm/min, from a stock roll to a tray of polymer solution containing spun-bonded polyester substrate submerged in polymer solution containing from 0.005 to 0.2 g poly(dimethylsiloxane-co-bisphenol A polycarbonate), referred to hereafter as "PDMS-co-pc", to one ml dichloromethane solvent. The polymer solution has a density greater than 1.0 and is overlaid with water to prevent evaporation. The polymer solution-saturated substrate is floated on the surface of the water where the polymer solution uniformly spreads throughout the interstices of the substrate material to form a polymer saturated substrate. Concurrently, as the polymer-solution saturated substrate moves across the tray, solvent from the polymer solution evaporates, causing the polymeric material to coalesce and form an ultra-thin dense skin asymmetric membrane. It is important that all of the solvent evaporate from the membrane before it is lifted off the water surface or the still soft membrane may collapse. The membrane-substrate composite is subsequently lifted out of the tray and residual solvent removed by air-drying.

It is apparent to those skilled in the art that this method can be varied in order to modify the resulting membrane. For example, polymer-solvent solutions having a density of one or less may be employed and alternative means to prevent evaporation of the solvent from the polymer-solvent solution, other than water, can be used. In addition, means for forced air or heated air drying may be used to reduce the gelling and drying time of the final membrane.

The rates of transport for gases across the membranes are governed by the permeabilities of the gases to the membrane and the differences in the partial pressures of the gases across the membrane. As used herein, the permeability of the membrane is defined by the permeability constant of the polymer membrane, in units of (ml gas, cm thickness)/(sec, cm$^2$, cm Hg$\Delta$P), which is related to the flux through thickness and partial pressure difference. An $O_2$ permeability of at least $(2.19 \times 10^{-4}$ ml$\times$)/(sec$\times$cm$^2\times$) is required in most applications. It is possible to calculate the concentration of $O_2$ and $CO_2$ inside the cage as a function of time by using the following variables: (1) exposed surface area, (2) volume of the cage, (3) permeability constant of the membrane material for each gas and, (4) the respiration rate of the animals under study. A simple kinetic model that takes into account the transport of oxygen and carbon dioxide across a membrane-fitted cage, suggests that it is possible to maintain a desirable environment for mice and other rodents. This model is represented by the following equation:

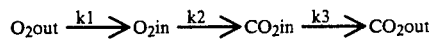

where $O_2$out and $CO_2$out are the respective ambient concentrations of oxygen and carbon dioxide; $O_2$in and $CO_2$in are the respective concentrations of oxygen and carbon dioxide inside the cage; k1 and k3 are the respective rate constants for oxygen and carbon dioxide transport, and k2 is the animal respiration rate.

The analytical solution to the four differential equations provides the concentrations of oxygen and carbon dioxide in the cage as a function of time. Simulated results are shown in FIG. 1 for a 25 microns thick 11"×7" ultra-thin dense skin membrane in a standard micro-isolator cage containing five mice. These theoretical calculations show that the flux of animal respiratory gases through polymeric membranes can be more than sufficient to support life for animals in hermetically sealed environments.

The calculations used for FIG. 1 were for a 25 micron thick membrane. Calculations for a membrane 1 to 5 microns thick suggest that the flux of gases through a membrane will provide an atmosphere that is not significantly different from that of the external surrounding atmosphere. The oxygen level is depleted by less than 1% and the carbon dioxide content is increased to less than 0.2%. The initial increase in the $CO_2$ level is the result of the short lag time before $CO_2$ diffuses through the membrane, and is a function of membrane thickness.

The preceding model is in agreement with results that have been obtained experimentally. Tests were conducted using a membrane-covered micro-isolator cage containing five mice. The membranes used for these tests ranged in thickness from 3 to 5 microns. In these tests, $CO_2$ levels varied from 0.4% to 1.1% and $O_2$ levels ranged from 20.2% to 20.7%.

The results of the model and experimental data, which account for animal respiration, standard number of animals per cage, and amount of exposed membrane surface area indicate that a membrane with a surface area of 500 cm$^2$, ranging from 2 to 8 microns in thickness, is adequate to provide an appropriate atmosphere in micro-isolator type cages. A membrane of this type is adequate to support five 25 gram mice in a standard micro-isolator cage with only a 1% drop in $O_2$ concentration relative to the atmospheric level of 20.9% $O_2$.

CONSTRUCTION OF ANIMAL OR PLANT CONTAINMENT APPARATUS

The containers into which the membranes are incorporated are known to those skilled in the art, or can be readily adapted for use with membrane from apparatus that are known. Examples include cardboard animal transport boxes used for shipping of poultry through the mail, small animal carriers, plastic micro-isolator cages, for animals, and plant culture containers such as the bags used in hybridization and fertilization studies, mushroom growing, etc. The membrane can be attached to cover openings in these containers using methods known to those skilled in the art, such as heat sealing, adhesives, or mechanical restraints. The membrane must be sealed at all edges of the openings remaining when the container is closed if the container is to exclude microorganisms and retain animal waste, hair, dander, and potential infectious agents.

CONSTRUCTION OF A BIRD TRANSPORT CONTAINER

Figure 2A:
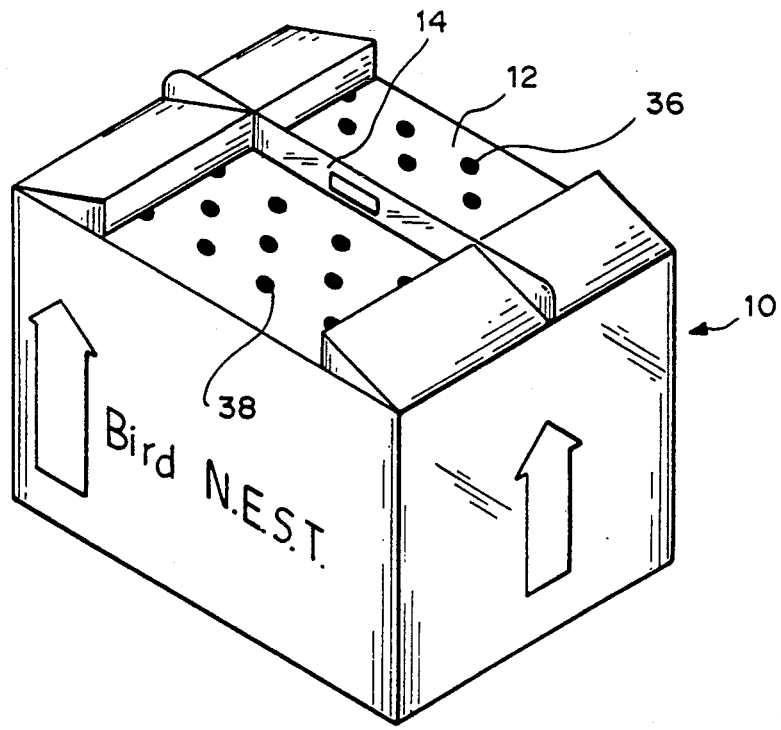
FIG. 2a is a prospective view of a bird shipping box.
Figure 2B:
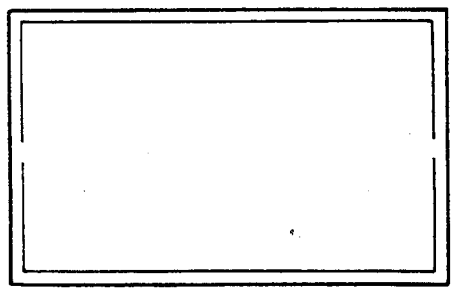
FIGS. 2b–2g are arrangements of partitions within the box of FIG. 2a, demonstrating various ways in which the box can be modified depending on the type of birds to be shipped.
Figure 2C:
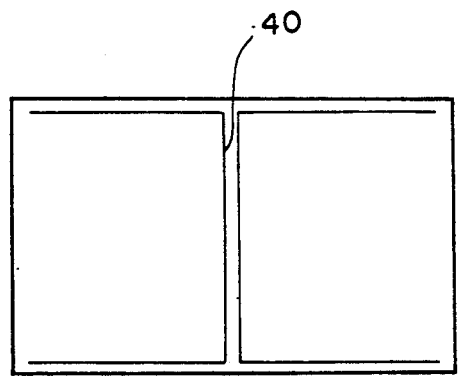
Figure 2D:
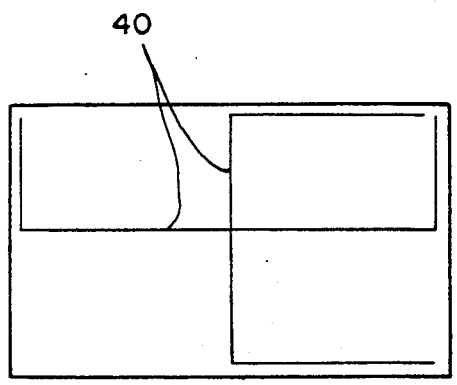
Figure 2E:
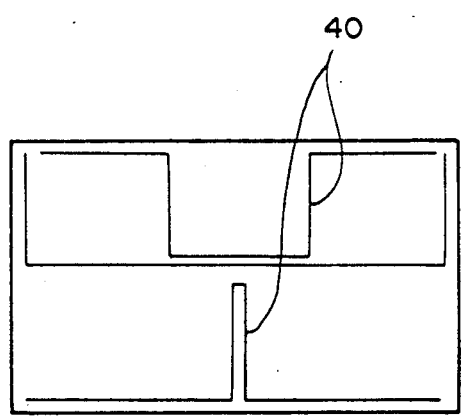
Figure 2F:
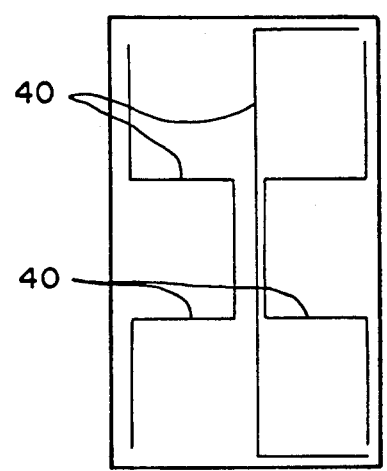
Figure 2G:
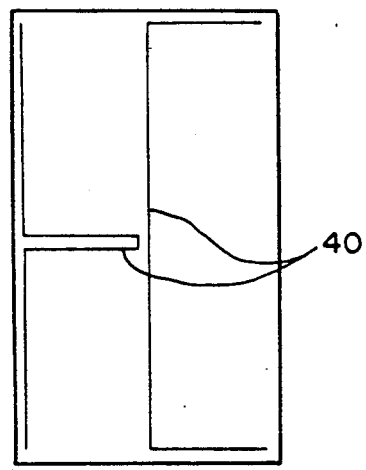

A preferred embodiment of the present invention is a bird shipping box having a membrane acting as a passive contamination barrier. Referring to FIG. 2a, the bird shipping box 10 is constructed of 275 lb. corrugated cardboard and measures approximately 45×61×35.6 cm high. The top of the box 12 closes to form a handle 14. The top of the box contains holes 36 each 2.54 cm in diameter. The holes are completely covered on the inside of the top portion of the box by non-porous membrane 38 that is sealably attached to the top. In the preferred embodiment, the membrane is attached with spray adhesive. The membrane is made of PDMS-co-pc formed in a monolayer approximately 1 micron thick. The membrane monolayer is supported on spunbonded polyolefin (Tyvek ®) porous substrate.

Another feature of the preferred embodiment is that the shipping box can be divided to accommodate various number and sizes of birds. Compartment size is important to insure that the birds are comfortable and unable to injure themselves. For example, pheasants require long thin compartments that prevent them from turning around and breaking their tail feathers. The shipping box may be further modified to provide padding on the lid to prevent scalping if the birds become excited and jump up and down. As shown in FIGS. 2b-g, the shipping box have dividers 40 to form compartments within the box.

CONSTRUCTION OF A RODENT ISOLATION CAGE

Another preferred embodiment of the present invention is a rodent isolation cage. The rodent isolation cage is similar in many aspects to bird shipping boxes in that it is essentially a membrane lined container for holding live animals in a biologically secure fashion. As with the other embodiments, the general shape and size of the container may be varied to suit the particular need. One embodiment of the isolation cage involves modifying the lid portion of the solid clear plastic "micro-isolator" cages currently used. A membrane is installed in place of the usual filter fabric in the micro-isolator lid. The membrane substantially reduces the particulates which can enter or leave the isolator without affecting the respiration of the confined animals.

The membrane used in this embodiment is multilayered PDMS-co-pc deposited on one side of spunbonded polyester (Reemay ®). Each membrane layer is approximately 1 micron thick.

Modifications and variations of the gas permeable ultra-thin dense skin monolayered and multilayer membranes, alone or as part of a containment apparatus for housing or shipping of animals or plants, and applications thereof, will be obvious to those skilled in the art from the foregoing detailed description. Such modifications and variations are intended to fall within the scope of the appended claims.

We claim:

1. A controlled environment container comprising: a container of an appropriate size and shape for animals, plants, or cells having an opening for air and heat exchange in combination with an ultra-thin dense skin, gas permeable composite polydimethylsiloxane membrane including a porous support substrate, permeable to gases and heat and impermeable to microorganisms, having a thickness between approximately 0.2 microns and 25 microns and an $O_2$ permeability of at least $2.19 \times 10^{-4}$ ml/(sec×cm$^2$), wherein the membrane covers the opening and is sealably attached at all edges of the opening and the combination of the membrane and support withstands sterilization and handling, having the same permeability to gases and heat and mechanical strength after sterilization as before.

2. The container of claim 1 wherein the membrane is a multilayered continuous membrane.

3. The container of claim 1 wherein the membrane is an anisotropic monolayered matrix membrane.

4. The container of claim 1 wherein the membrane has adequate membrane permeability to oxygen and carbon dioxide for a membrane having a surface area of 500 cm$^2$ to support five 25 gram mice in a microisolator cage.

5. The container of claim 1 wherein the membrane is formed of a polymer selected from the group consisting of linear and cross-linked polydimethylsiloxanes, copolymers, and blends thereof.

6. The container of claim 5 wherein the membrane is formed of a polymer selected from the group consisting of polydimethylsiloxane wherein phenyl, vinyl, trifluoropropyl, silanol or hydrogen is substituted for methyl, polydimethylsiloxane bisphenol A polycarbonate block co-polymers, polydimethylsiloxane polysulfone block co-polymers, poly, copolymers, and blends thereof.

7. The container of claim 1 wherein the porous support substrate in the membrane is selected from the group from the group consisting of natural polymers, synthetic polymers and metals.

8. The container of claim 6 wherein the porous substrate material is a polymer selected from the group consisting of polyesters, polyethylenes, polyamides, polycarbonates, polysulfones, polypropylenes, polytetrafluoroethylene, polyolefin, and combinations thereof.

9. The container of claim 1 wherein the container is a bird shipping box with openings completely covered with poly(dimethylsiloxane-co-bisphenol A polycarbonate) membrane supported by spunbonded polyolefin substrate, with layers approximately one micron thick.

10. The container of claim 9 comprising dividers placed within the container to form compartments.

11. The container of claim 1 wherein the container is a micro-isolator cage with openings completely covered with poly(dimethylsiloxane-co-bisphenol A polycarbonate) membrane supported by spunbonded polyester substrate, with layers approximately one micron thick.

12. A method for making a controlled environment container comprising:
providing a gas permeable ultra-thin dense skin composite polydimethylsiloxane membrane including a porous support substrate, permeable to gases and heat and impermeable to microorganisms, having an overall thickness between approximately 0.2 microns and 25 microns and an $O_2$ permeability of at least $2.19 \times 10^{-4}$ ml/(sec$\times$cm$^2$), wherein the combination of the membrane and support withstands sterilization and handling, having the same permeability to gases and heat and mechanical strength after sterilization as before,
providing a container of an appropriate size and shape for animals, plants or cells having openings for air and heat exchange, and
sealably attaching the membrane at all edges of the openings to produce membrane covered openings providing adequate gas exchange and release of metabolic heat for the animals, plants or cells that are contained to survive.

13. The method of claim 12 wherein the membrane is a multilayered continuous membrane.

14. The method of claim 12 wherein the membrane is an anisotropic monolayered matrix membrane.

15. The method of claim 12 wherein the membrane has adequate membrane permeability to oxygen and carbon dioxide for a membrane having a surface area of 500 cm$^2$ to support five 25 gram mice in a microisolator cage.

16. The method of claim 12 wherein the membrane is formed of a polymer selected from the group consisting of linear and cross-linked polydimethylsiloxanes, co-polymers, and blends thereof.

17. The method of claim 16 wherein the membrane is formed of a polymer selected from the group consisting of polydimethylsiloxane wherein phenyl, vinyl, trifluropropyl, silanol or hydrogen is substituted for methyl, polydimethylsiloxane bisphenol A polycarbonate block co-polymers, polydimethylsiloxane polysulfone block co-polymers, poly copolymers, and blends thereof.

18. The method of claim 12 wherein the porous support substrate in the membrane is selected from the group from the group consisting of natural polymers, synthetic polymers and metals.

19. The method of claim 18 wherein the porous substrate material is a polymer selected from the group consisting of polyesters, polyethylenes, polyamides, polycarbonates, polysulfones, polypropylenes, polytetrafluoroethylene, polyolefin, and combinations thereof.

20. The method of claim 12 further comprising placing dividers within the container to form compartments.

21. The method of claim 12 wherein the membrane is formed into a shape appropriate for containment of plant material.

22. The method of claim 12 further comprising sterilizing the membrane.

23. The method of claim 12 wherein the container is a bird shipping box with openings completely covered with poly(dimethylsiloxane-co-bisphenol A polycarbonate) membrane supported by spunbonded polyolefin substrate, with layers approximately one micron thick.

24. The method of claim 12 wherein the container is a micro-isolator cage with openings completely covered with poly(dimethylsiloxane-co-bisphenol A polycarbonate) membrane supported by spunbonded polyester substrate, with layers approximately one micron thick.

25. The method of claim 12 wherein the container is made to contain organisms selected from the group consisting of mammals, fish, birds, reptiles, cultured mammalian cells, cultured fish cells, cultured bird cells, and cultured reptilian cells.

26. The method of claim 25 further comprising sterilizing the container.

* * * * *